July 3, 1923.
J. RITTER
1,460,501
LIGHT PROJECTING APPARATUS
Filed June 3, 1921
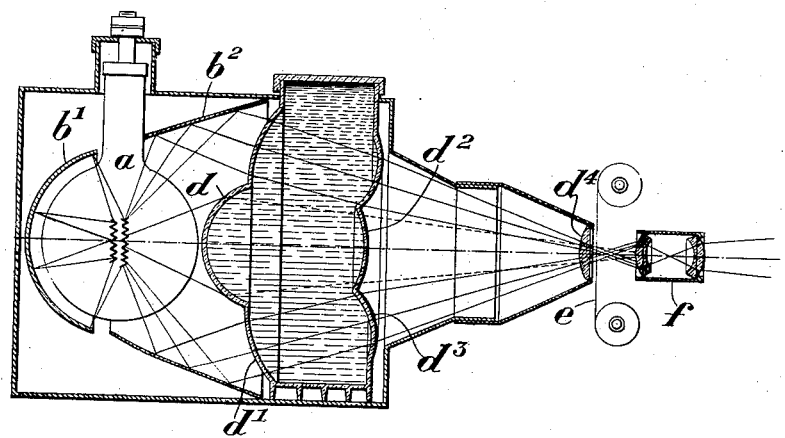
Inventor:
Jakob Ritter
By
Lawrence Langner
Atty.

Patented July 3, 1923.

1,460,501

UNITED STATES PATENT OFFICE.

JAKOB RITTER, OF BASEL, SWITZERLAND.

LIGHT-PROJECTING APPARATUS.

Application filed June 3, 1921. Serial No. 474,704.

*To all whom it may concern:*

Be it known that I, JAKOB RITTER, a citizen of the Swiss Republic, and resident of Basel, Switzerland, have invented new and useful Improvements in Light-Projecting Apparatus, of which the following is a full, clear, and exact specification.

This invention relates to light projecting apparatus and has for its object to provide an improved construction of projector of the kind comprising catoptric and dioptric light condensers, the latter of which is of the liquid lens type.

According to the present invention the dioptric light condenser comprises a liquid lens near to the lamp with a particular forward and rearward annular lenticular zone around its central lenticular part and a rear glass lens at a substantial distance beyond the liquid lens, with the object to direct the side light rays reflected from the catoptric condenser past the lenticular centre part and through the annular lenticular zone part of the liquid lens and to combine them with the central light rays to a convergent beam in the dioptric condenser passing through the slide or film bearing the image to be projected and through the objective of the projector.

The invention is illustrated in the accompanying drawing by a diagrammatic view in sectional side elevation.

In the construction illustrated, the catoptric condenser is composed of a hollow spherical surface $b^1$ arranged behind the lamp $a$ and a conical surface $b^2$ arranged in front of the lamp. The dioptric condenser consists of two lenticular elements arranged at a substantial distance from one another, one of these elements, which is that placed near to the lamp, being constituted by a liquid lens having on its front side a central lenticular portion $d$ and an annular lenticular section $d^1$ around the same and on its rear side also a central lenticular portion $d^2$ and an annular lenticular section $d^3$ around the same, the other element being a simple glass lens $d^4$. The light rays reflected from the catoptric condenser pass through the annular sections $d^1$, $d^3$ past the lenticular central portions $d$, $d^2$ and combine with the light rays passing through the central portions $d$, $d^2$ of the liquid lens of the dioptric condenser so as to converge on to the glass lens $d^4$ being then projected through the slide or film $e$ and the objective $f$ on to the projection surface.

The liquid lens is preferably constituted by a glass receptacle containing circulating liquid, and serves to protect the film or slide from the heat of the lamp in a known manner. Its particular form with an annular lenticular zone around the central portion ensures the correct direction and condensation of the light rays reflected by the catoptric condenser with the central rays emitted directly from the lamp, so as to obviate the formation of different light centres on the projection surface.

The lenticular portions $d$, $d^1$, $d^2$, $d^3$ of the condenser are all convex in form as shown in the drawing and in one form of the apparatus as actually constructed the radii of curvature of these portions are as follows:—

The radius of curvature of $d = 90$ mm.
The radius of curvature of $d^1 = 190$ mm.
The radius of curvature of $d^2 = 180$ mm.
The radius of curvature of $d^3 = 105$ mm.

It will be understood that the invention is not limited to these particular dimensions nor to the ratios between the radii of curvature constituted thereby as other ratios may be adopted if desired. The distances between the source of light and the optical centre of the condenser and between the latter point and the optical centre of the lens $d^4$ are preferably in the ratio of two to three, this ratio being, however, also subject to variations in order to meet particular conditions.

What I claim is:

1. In a light projecting apparatus, the combination with a lamp of a catoptric light condenser and a dioptric light condenser, said dioptric light condenser comprising a liquid lens near to the lamp with a forward and rearward annular lenticular zone and a rear glass lens at a substantial distance beyond the liquid lens and being so arranged as to concentrate the rays from the catoptric light condenser through its annular lenticular zone to the said rear glass lens, substantially as and for the purpose described.

2. In a light projecting apparatus, the combination with a lamp of a catoptric light condenser and a dioptric light condenser, said dioptric light condenser comprising, on the one hand, a liquid lens near to the lamp having on its front side a central lenticular portion and an annular lenticular section around the same and on its rear side also a central lenticular portion and an annular lenticular section around the same, and on the other hand, a rear glass lens arranged at a substantial distance beyond the liquid lens so that the rays from the catoptric light condenser are concentrated through the annular lenticuluar zone of the liquid lens to the said rear glass lens, substantially as and for the purpose described.

In witness whereof I have hereunto signed my name this 20th day of May 1921, in the presence of two subscribing witnesses.

JAKOB RITTER.

Witnesses:
FRIDA KURZ,
AMAND GRANN.